United States Patent [19]

Burgsmüller

[11] 4,268,197
[45] May 19, 1981

[54] DEEP DRILLING TOOL

[76] Inventor: Karl Burgsmüller, Haus Hainberg, 3350 Kreiensen, Fed. Rep. of Germany

[21] Appl. No.: 907,865

[22] Filed: May 19, 1978

[30] Foreign Application Priority Data

May 28, 1977 [DE] Fed. Rep. of Germany ....... 2724266

[51] Int. Cl.³ .............................................. B23B 51/04
[52] U.S. Cl. ......................................... 408/59; 408/57
[58] Field of Search ..................... 408/59, 57, 56, 204, 408/207, 705

[56] References Cited

U.S. PATENT DOCUMENTS

| 841,184 | 1/1907 | Roeske | 408/59 |
| 2,780,947 | 2/1957 | Willingham | 408/59 |
| 3,701,606 | 10/1972 | Bogsten | 408/59 |

FOREIGN PATENT DOCUMENTS

569401 8/1977 U.S.S.R. ................................. 408/59

Primary Examiner—William R. Briggs
Attorney, Agent, or Firm—Michael J. Striker

[57] ABSTRACT

The deep drilling tool for workpieces includes a drill bit having an orifice with at least one cutting edge, and a hollow drill stem connectable to the drill bit. The interior of the stem is divided by a longitudinal partition in at least two separate passages. One passage communicates with the orifice of the bit whereas the end part of the or each other passage communicates through openings in the wall of the stem with the exterior surface of the tool. The free end of the stem is provided with inlet means for feeding pressure fluid into the or each other passage, whereas the used pressure fluid together with the drilling chips is discharged through the bit orifice and the first-mentioned passage.

14 Claims, 12 Drawing Figures

DEEP DRILLING TOOL

BACKGROUND OF THE INVENTION

This invention relates generally to deep drilling tools for workpieces and more particularly, it relates to a deep drilling tool of the type having a drill bit supporting at least one cutting edge, and a drill tube or stem connectable to the drill bit. The drill stem communicates with an orifice of the drill bit and the free end of the drill stem is provided with an inlet for introducing a pressure fluid into the borehole.

In German Pat. DE-PS 767 138 granted to applicant, a tubular deep drilling stem of a symmetrical cross-section has been described that has found broad application all over the world and has almost fully replaced, in the range of drilling diameters over 10 mm, the conventional deep-drilling stems having a rolled-in longitudinal outer groove for discharging drilled chips. The drilling stem according to this patent feeds the drilling pressure fluid by means of a "BOZA" apparatus (drilling oil feeding apparatus) into the annular space between the wall of the bore hole and the outer surface of the deep drilling stem to the drill bit. In the area of the drill bit the fluid takes along drilling chips and flows on past a cutting edge into an abruptly increased interior space of the deep-drilling stem where the flow velocity of the fluid as well as of the chips carried therewith is abruptly decreased; at this low speed the mixture is discharged at the end of the stem out of the bore hole. The larger the cross-section of the area to be drilled in the bore hole by the drilling tool, the larger the annular space which has also to be provided in order to attain sufficient speed of the pressure fluid in the drill bit orifice and, consequently, to insure an instant withdrawal of the chips from the critical drilling area. As a rule, in the case of a rotating workpiece and stationary drilling tool as well as in a reversed or combined mode of operation, the annular cross-sectional area between the wall of the bore hole and the stem pipe has to be about 25% larger than the cross-sectional area of the drill bit orifice because even at a depth of the bore hole of about 20 times the diameter of the bore hole, a pressure drop due to the relative rotary motion between the walls of the annular space and due to the resulting heating of the pressure fluid caused by this motion, takes place. For this reason, a drilling stem having a relatively small diameter in comparison to the required diameter of the bore hole and having also relatively thin walls, has to be employed. Consequently, the resistance of the shaft against lateral flexure, against torsion and especially against torsional swing is relatively small. As a result, it is necessary to operate at a reduced drilling output and at a reduced drilling or cutting speed, especially when hard metal cutters having a long life are employed. Naturally, the economy of deep drilling is impaired.

A deep drilling tool is known from the German Pat. DE-PS 14 77 730 in which the drilling stem consists of two concentric tubes. The annular space between the two tubes serves for feeding the pressure fluid into the bore hole and the mixture of the pressure fluid with the drilling chips is discharged through the inner tube. It is true that in this embodiment it is possible to place the exterior pipe of the shaft relatively close to the wall of the bore hole; nonetheless the cross-sectional area of the annular space has to be maintained relatively large in order that the undesirable pressure drop of the pressure fluid caused by friction on the relatively large wall areas of the annular space, be prevented. In view of the fact that the cross-sectional area of the inner tube has to be maintained at a minimum value just sufficient for a reliable discharge of drilling chips, the desired radial extension of the annular space can be made only by limiting the thickness of the walls of the concentric tubes. The disadvantage of such measures, however, is the fact that the strength and mechanical resistance of the drilling stem is limited and such limitation, especially in deep bore holes, is undesirable.

In another prior art deep drilling tool according to my German Pat. DE-PS 1 290 026 the stem, similarly as in the previously discussed DE-PS 14 77 730, has two concentric pipes. The inner pipe, however, is connected to the outer pipe under torsional bias to form a torsional unit. Nonetheless, as far as the feeding of the pressure fluid is concerned, the same limitations as in the DE-PS 14 77 730 also obtain.

SUMMARY OF THE INVENTION

Accordingly, the primary object of this invention is to avoid the disadvantages of prior art drilling tools. More specifically, an object of this invention is to provide a drilling tool having an increased quality and mechanical resistance.

Another object of this invention is to increase the performance of the tool.

Still another object of this invention is to secure sufficient feeding of pressure fluid.

In keeping with these objects, and others which will become apparent hereafter, one feature of the invention resides, in a deep drilling tool having internal feeding of pressure fluid, in a combination which comprises a hollow drill bit and a tubular drill stem that is longitudinally divided by means of a longitudinal partition in at least two passages. The lateral edges of the partition are in contact with the inner wall of the stem whereby at least one of the passages is employed for feeding the pressure fluid into the bore hole whereas the remaining passage serves for discharging the pressure fluid together with drilling chips from the bore hole.

In this manner, the total area of the walls of the passage or passages for feeding the pressure fluid and consequently the pressure drop due to friction can be considerably decreased. On the other hand, the thickness of the wall of the stem pipe can be increased. As a consequence, an advantageous increase of resistance against lateral flexure and against torsion of the stem is also achieved. The drilling output is improved by increasing the effective chip sections and/or the cutting speed. Also, the durability of the drilling tool is improved. It is advantageous that by increasing the diameter and further the thickness of the wall of the stem pipe, the deviation of the deep drilling tool relative to the center axis of the bore hole is avoided, so that excessively long drill bits or guiding pads on the drill bit as well as extra long drilling sleeves, can be dispensed with.

Another advantage of this invention resides in the fact that by modifying the configuration and the arrangement of the longitudinal partition inside the stem pipe it is possible to make practically any desired division of the inner cross-section of the stem pipe in accordance with particular operative conditions. Especially the size and the form of the inner passage for discharging the mixture of pressure fluid with chips can be adjusted with respect to the geometry of the chips. The relative size of the cross-sectional areas of respective passages in the stem can be adjusted for a minimum consumption of the pressure fluid so that a considerable cost saving in the drilling operation can be achieved. Preferably, the stem pipe has a circular cross-sectional area. The configuration and the size of the longitudinal partition can be selected at will. The pressure fluid can be a gas or a liquid or a mixture of both and as known per se it performs the function of cooling, lubricating and chip removing. In the following text the term "lateral surfaces" means also the lateral edges of the longitudinal partition in the sense that they are in relatively small contact with the interior of the stem pipe.

According to one embodiment of this invention the lateral contact surfaces of the partition are at least approximately in sealing contact with the inner wall of the pipe. This arrangement enables the entire stream of the pressure fluid to be fed to the area of drilling.

According to another embodiment of the invention each lateral surface is provided with an elastic sealing element extending along the entire length of the partition and cooperating with the inner wall of the stem pipe. The sealing elements can be made for example of oil-resistant rubber or plastic material such as polyvinylchloride, polyamide or polypropylene. The sealing elements can also be in the form of packing strips embedded in the lateral surfaces or can be produced by pressing an initially viscous packing material into longitudinal grooves in and gaps between the side surfaces of the partition and the inner wall of the stem pipe. An additional sealing compression of the packing elements on the inner wall of the pipe results from the pressure difference between the pressure fluid in the inlet passage and the outlet passage divided by the partition. The elastic packing means damp torsional vibrations of the deep drilling tool as well as noises produced by such vibrations.

According to still another embodiment of the invention the packing element is made in the form of a sealing hose the interior of which is inflated by a pressure fluid. In this manner, it is possible to control the sealing effect by controlling the admission of the pressure fluid into the sealing hose.

According to still another embodiment of this invention at least one sealing hose communicates in the proximity of the drilling bit with a lubrication channel that passes through the wall of the stem pipe and opens into the outer surface area of the drill bit having guiding pads. In this embodiment, the pressure fluid is preferably a lubrication liquid such as, for example, a drilling oil emulsion or concentrated deep drilling oil. In any case the amount of drilling oil required for producing a sufficient lubrication of the drilling bit can be kept at minimum whereby the conventional apparatus for mixing the drilling oil into the flushing or washing medium is no longer needed.

In one embodiment of this invention, the partition is made in the form of a dividing wall. This dividing wall is simple, inexpensive and sufficiently rigid for all operational needs. In another modification of this invention the dividing wall is arched transversely with respect to the longitudinal axis of the drilling tool. By selecting the degree of arching it is possible to adjust the relative sizes of cross-sections of the inlet and outlet passages. A small curvature is recommended for example in the case of broken drilling chips whereas an increased curvature is recommendable in the case of shorter curled chips or in the case of elongated winding chips.

A well-defined position of the partition relative to the stem pipe that is suitable for all operational conditions results, according to this invention, when the side surfaces of the partition and/or the packing elements contact, respectively, diametrically opposed surface portions of the inner wall of the stem pipe. In a modification of the above-mentioned embodiment, it is advantageous to place the lateral surfaces and/or the packing elements of the partition in contact with juxtaposed portions of the inner wall of the stem pipe at lines that lie past the largest interior clearance of the pipe when viewed from the passage for feeding the pressure fluid. In this case the partition is pressed into sealing contact with the inner wall of the pipe by the aid of the pressure difference between respective passages on both sides of the partition.

It is advantageous to direct the convex surface of the partition or of the dividing element into the passage for feeding the pressure fluid.

A fully unobstructed discharge of the pressure fluid together with the chips is attained when the orifice of the drilling bit opens with its full cross-sectional area into the discharge passage.

According to another embodiment of this invention the partition surrounds the passage for discharging the mixture of the pressure fluid with the chips, and is in contact with the inner wall of the stem pipe at least along two contact lines. In this modification no packing means between the feeding passage and the discharging passage are necessary.

According to still another modification of this invention the side surfaces of the partition are sealingly connected to the inner wall of the stem pipe, for example, by welding or by means of an adhesive agent. In this manner an advantageous reinforcement of the drilling stem as desired, for example, in precision drilling, is attained. In another modification of this invention, the partition has a plurality of lateral edges or contact surfaces, the number and distribution of which corresponds to the number and distribution of cutting edges in the drilling bit. By this arrangement, advantageous symmetrical feeding and discharging conditions in the deep drilling tool are achieved.

Favorable fluid discharging conditions also result when, according to this invention, the cross-sectional area of the passage for the discharge of the pressure fluid together with the chips is equal to or only slightly larger than the maximum cross-sectional area of the corresponding orifice or orifices of the drill bit.

According to a preferred embodiment of the invention the drill bit is connected to the stem pipe by taper threads. In comparison with cylindrical screw connections described in applicant's German Auslegeschrift DE-AS 1 752 024 the tapered screw connection according to this invention has the advantage of a faster and positionally more accurate connection between the drill bit and the stem pipe. In particular, an exact relative position between the drill bit and the stem pipe can be attained without trouble. The flank angle of screw threads of the tapered threaded surfaces can be, for example, 90°. The tapered thread is relatively easy to manufacture e.g. by "whirling" (cf. U.S. Pat. No. 3,966,348). The tapering thread of course can have the conventional flank angle of screw thread of 60° and can be either metric or American standard. The force components occurring during the deep drilling can be transferred between the drill bit and the stem more easily and in more reliable manner.

According to still another embodiment of this invention the tapered connection between the drilling bit and the stem has a multiple thread for providing a relatively large pitch of the screw threads, making the connection less sensitive to damage or overload. By this means the alignment of the outlet openings of respective orifices in the drill bit with the openings of respective passage for the discharge of the mixture of pressure fluid with chips, is facilitated. For example, an eighteen times threaded or even thirty-six times threaded screw connection can be employed. It is advantageous when the number of threads is divisible by three.

In another preferred embodiment of this invention the dividing partition is made in the form of a twisting member connected under a torsional prestress to the stem pipe whereby particular attention is to be paid to the mutual adjustment of torsional characteristics of the stem pipe and the twisting member. In establishing the torsional prestress the twisted stem pipe and the twisted partition become elastically shortened. As a result, the torsionally prestressed drill stem is subject to desirable variations in length during the process of drilling. This length variation has the consequence that the cutting edges remain in constant engagement with the bottom of the bore hole and do not jump even when the whole drilling stem is torsionally overloaded by a suddenly increased drilling resistance that may result due to inhomogeneities in the drilled material, for example. Because of the partial cancellation of the torsional prestress due to the overload, the drilling stem is elastically extended in length so that the cutting action and contact with the bottom of the bore hole is maintained.

The torsionally prestressed deep drilling tool is preferably made according to the following steps:

(a) the partition is manufactured as a member twisted in the direction of a cutting force acting on the deep drilling tool;

(b) the twisted partition is inserted into the stem pipe and is secured thereto at one end, preferably at the end facing the drill bit; and (c) the other end of the twisted partition and the stem pipe are rotated relative to each other until the desired torsional prestress in the twisting direction is attained and in this condition the two parts are fixed.

The twisted partition according to this invention can be manufactured from a pipe that is cut or severed for example by the aforementioned "whirling", along at least two helical lines so that at least two helically twisted partition elements are produced. The drilling stem manufactured according to this method has, due to the initial helical shape of the twisted partition, particularly distinct length variation characteristics during the drilling process. As a result, the drilling operation is improved and the working life of the cutting edge is increased.

In a further elaboration of the method of this invention, the side edges of the twisted element, after the aforementioned step (c), are sealingly secured to the inner wall of the stem pipe by welding or glueing, for example. By means of this rigid connection the torsionally prestressed condition of the system is fixed so that especially in precision drilling, a desirable reinforcement of the drill stem will result.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
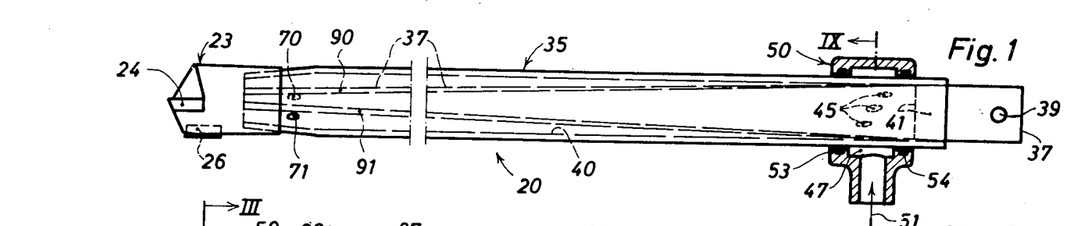
FIG. 1 is a side view of the deep drilling tool of this invention.
Figure 2:
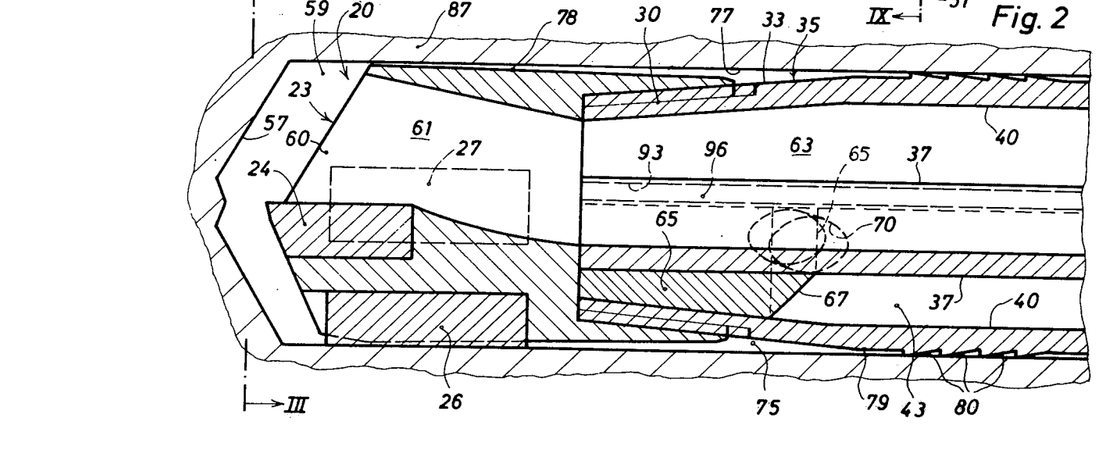
FIG. 2 is a sectional side view of the leading portion of the deep drilling tool according to FIG. 1 shown on an enlarged scale.
Figures 3, 4, 5, 6:
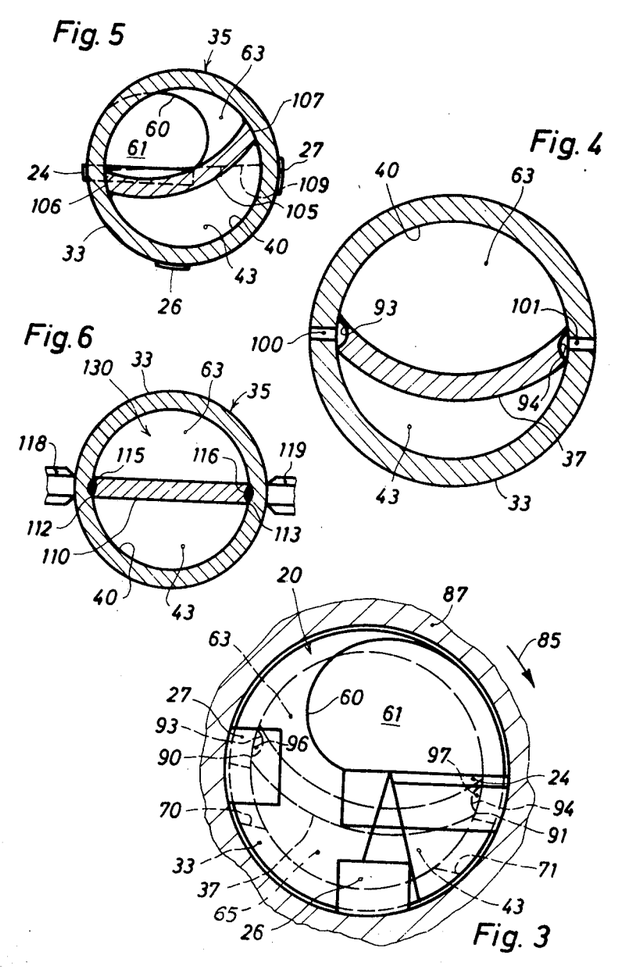
FIG. 3 is a sectional view of the tool of FIG. 2 taken along line III—III of FIG. 2.
FIG. 4 is a sectional plan view of the drilling stem of the deep drilling tool according to FIG. 1 shown on enlarged scale.
FIG. 5 is a sectional plan view of a modification of the drilling stem.
FIG. 6 is a sectional plan view of still another modification of the drilling stem.

FIG. 1 shows a deep drilling tool 20 including a drill bit 23 with a cutting edge 24 and two guiding pads 26 and 27 (FIG. 3). The drill bit 23 is connected by a tapered thread 30 (FIG. 2) with a pipe 33 of a drilling stem 35.

Inside the stem pipe 33 is arranged a twisted member or partition 37 forming a dividing wall the function of which will be explained below. The rear end of the twisted member 37 projects from the stem 35 and is provided with a hole 39. The forward end of the twisting member 37 is secured in position to the stem pipe 33. To produce a torsional prestress between the twisted member 37 and the stem pipe 33, the pipe is clamped, preferably at its rear end, and by means of a tool inserted into the hole 39 and twisted, the twisting member 37 and the stem pipe 33 are torsionally prestressed to a desired degree. In this torsionally strained condition a fitting piece 41 is inserted between one side of the twisted member 37 and the inner wall 40 of the pipe 33, and thereafter the fitting piece 41 is secured in position by soldering or brazing, for example. In this manner the applied torsional prestress is "frozen" in the drilling stem 35. Subsequently, the projecting portion of the twisting member 37 can be cut off.

The fitting piece 41 forms a rear limiting surface for a passage 43 (FIG. 2) extending throughout the drilling stem 35. The rear portion of the passage 43 has several inlet openings 45 that, for the sake of strength of the stem, are mutually staggered in axial direction. The openings 45 are surrounded by an annular space 47 of a fluid inlet unit 50 through which the pressure fluid is fed in the direction of arrow 51 into the passage 43. The fluid inlet unit 50 is provided with sealing rings 53 and 54 to prevent leakage between the unit 50 and the outer surface of the stem 35.

FIG. 2 illustrates the leading part of the deep drilling tool of this invention in a position slightly raised above the bottom 57 of a bore hole 59. A cutting edge 24 delimits one side of a chip mouth or recess 60 in the wall of the drill bit 23; the recess 60 communicates via an open space or orifice 61 in the drill bit 23 with a discharge or outlet passage 63 formed in the stem pipe 33.

The twisted member 37 in this embodiment is in the form of a transversely arched partition that at its forward end is secured to the inner wall 40 of the stem pipe 33 by means of a fitting piece 65. The fitting piece 65 is fixed in position by soldering for example, and its surface 67 forms the front limiting surface of the fluid inlet passage 43. In the range of the surface 67, openings or ports 70 and 71 (FIGS. 1 and 3) in the wall of the pipe 33 are provided and through these openings 70, 71 the inlet pressure fluid flows into the annular space 75 formed between the wall 77 of the bore hole and the outer surfaces 78 and 79 of the drill bit 23 and the stem pipe 33. As indicated in FIG. 2, a portion of the outer wall 79 of the pipe 33 above the annular space 75 is provided with projections 80 forming a labyrinth-like arrangement the purpose of which is to prevent substantial rearward leakage of the pressure fluid discharged into the annular space 75 in the bore hole. By means of the sealing labyrinth 80 most of the pressure fluid flows into the area of drilling at the bottom of the bore hole and only a relatively small part of the pressure fluid penetrates through the labyrinth 80 to lubricate the surfaces between the pipe 33 and the wall 77 of the bore hole. This lubrication is needed especially if a relatively deep bore hole 59 is drilled. Prevailing part of the pressure fluid flows through the annular space 75 past the cutting edge 24 into the drilling or cutting area 57 where the fluid expands into the recess 60 and the interior of the drilling tool. During this expansion the pressure fluid considerably cools down. In the drilling area 57 the pressure fluid takes along the chips from the bore hole and carries along the chips rearwardly through the recess 60, the orifice 61 of the drill bit and the outlet passage 63 of the stem until the mixture of the pressure fluid and the chips is discharged at the rear end of the drill stem 35.

In FIG. 3, arrow 85 shows the relative rotary movement of a workpiece 87 with respect to the deep drilling tool 20. The twisted member 37 forming a transversely arched partition in the interior of the drill stem has lateral edges or surfaces 90 and 91 provided with longitudinal grooves 93 and 94. In the longitudinal grooves 93 and 94 are provided respective elastic packing pieces 96 and 97 abutting against the inner wall 40 of the pipe 33. The lateral surfaces 90 and 91 contact diametrically opposed areas on the inner wall 40.

FIG. 4 shows bore holes 100 and 101 through the wall of the stem pipe 33 communicating with the longitudinal grooves 93 and 94. Through the bore holes 100 and 101 an initially liquid sealing agent is introduced until the longitudinal grooves 93 and 94 are completely filled and solidified packing pieces 96 and 97 will result. Subsequently, the bore holes 100 and 101 are closed by suitable pins, not shown in the drawing.

In FIG. 5, a transversely arched partition wall in the form of a twisting strip 105 contacts with its lateral surfaces 106 and 107 areas on the inner wall 40 of the pipe 33 that, viewed from pressure fluid feeding passage 43, lie beyond the maximum clearance of the drilling stem 35 as indicated by dashed line 109 corresponding to the diameter of the stem. The side surfaces 106 and 107 in one modification can be either fixedly connected to the inner wall 40 by welding for example, or they can be in slidable contact with the inner wall by means of sealing pieces similar to sealing elements 96 and 97 illustrated in preceding Figures. In the latter case the pressure fluid in the inlet passage 43 provides sufficient pressure against the wall of the partition 105 as to sealingly press the lateral surfaces 106 and 107 with the assigned packing pieces against the inner wall 40 of the pipe 33, because the fluid pressure in the passage 63 is smaller than the pressure in the passage 43.

FIG. 6 illustrates a dividing wall 110 having a straight transverse cross-section. The lateral surfaces 112 and 113 of the partition 110 are continuously connected to the inner wall 40 of the pipe 33 by welds 115 and 116. The welds 115 and 116 can be produced for example by movable resistance welding electrodes 118 and 119 moved along juxtaposed jacket lines of the pipe 33.

Figures 7, 8, 9:
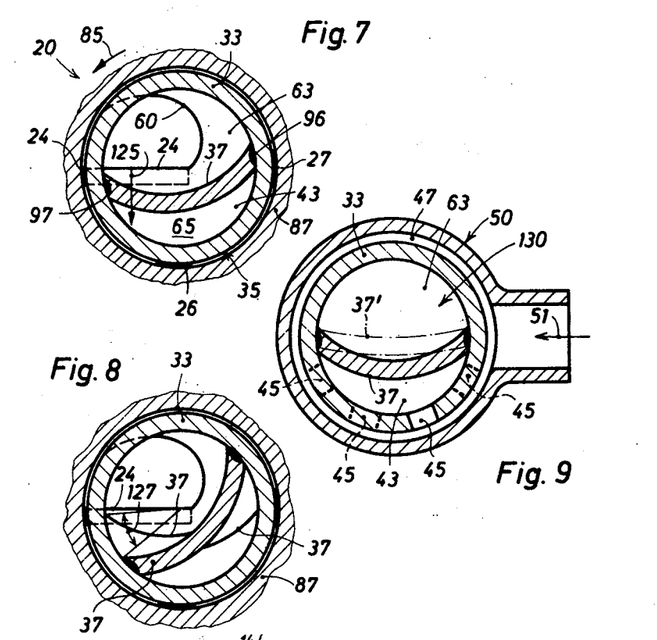
FIG. 7 shows a sectional plan view of the drilling stem of this invention prior to the introduction of the torsional bias.
FIG. 8 shows the stem of FIG. 7 after the tool has been torsionally prestressed.
FIG. 9 is a sectional plan view of the drilling stem according to FIG. 1 taken along line IX—IX.

FIGS. 7 and 8 are sectional views of the drilling stem of FIG. 1 viewed in the direction toward the drill bit 23. FIG. 7 shows the drilling tool in a manufacturing condition in which a twisting member 37 has been inserted into the pipe 33, provided with packing elements 96 and 97 and fixedly connected to the inner wall of the pipe 33 in the area facing the drill bit 23 by the fitting piece 65. In this condition no torsional prestress has yet been applied between the pipe 33 and the twisting member 37. Arrow 125 indicates a cutting force acting upon the cutting edge 54 during later drilling.

FIG. 8 illustrates the torsional prestressed condition of the drill stem in which the rearward fitting piece 41 (FIG. 1) is secured in position. Due to the torsion applied to the rearward end (FIG. 1) of the twisting member 37 in the direction of the cutting force 125, the twisting member 37 has in FIG. 8 been twisted over its entire axial length through an angle 127. At the same time the stem pipe 33 has likewise been twisted counterclockwise in FIG. 8 over its entire axial length through an angle not shown in FIG. 8 but smaller than angle 127. The stem pipe twisting angle is smaller because with the wall thickness ratio between the stem pipe 33 and the twisting member 37 shown in FIG. 8, the resistance to torsion of the pipe 33 is greater than that of the twisting member 37.

FIG. 9 shows a sectional plan view along line IX—IX of FIG. 1 of the rear part of the drill stem with the pressure fluid feeding unit 50. The twisting member 37 divides in axial direction the interior 130 of the drill stem 33 into a fluid inlet passage 43 having a sickle-like cross-section, and a discharge passage 63 of a substantially elliptical cross-section. As has been mentioned before, however, if for some reason or another it is desired to change the ratio of the cross-sectional areas of the respective passages, the arching of the twisting member 37 can be increased or reduced. The incoming pressure fluid 51 enters the annular interspace 47 and through openings 45 enters the inlet channel 43.

Figure 10:
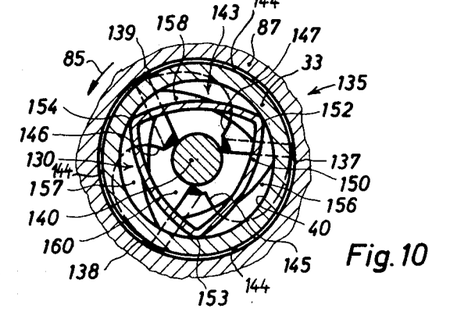
FIG. 10 is a sectional plan view of still another embodiment of the drilling stem for use in connection with a drill bit having three cutting edges.

FIG. 10 illustrates a modification of the deep drilling tool 135 having three cutting edges 137, 138 and 139 uniformly arranged on the circumference of the drill bit. This multiple cutting edge arrangement is used for core drilling where a core of the drilled material remains in the empty central area between the ends of respective cutting edges. This multiple-edge drill bit 143 includes three chip mouths 145, 146 and 147 and three guiding pads 144 assigned respectively to corresponding cutting edges. The twisting member 150 in this case has the form of a shaped so-called K-profile tube having a cross-section of a spherical triangle defining three contact edges 152, 153 and 154 each abutting against the inner wall 40 of the stem pipe 33. Three passages 156, 157 and 158 resulting between the inner wall 40 and the outer wall of the twisting member 150, serve for introducing pressure fluid into the bore hole. The discharge of the mixture of the pressure fluid and the chips is effected through the interior space 160 between the inner wall of the twisting member 150 and the core 140.

Even in this case, the twisting member 150 and the pipe 33 are brought under torsional prestress relative to each other in the same manner as the twisting member 37 and pipe 33 in the embodiment shown in FIG. 8.

Figure 11:
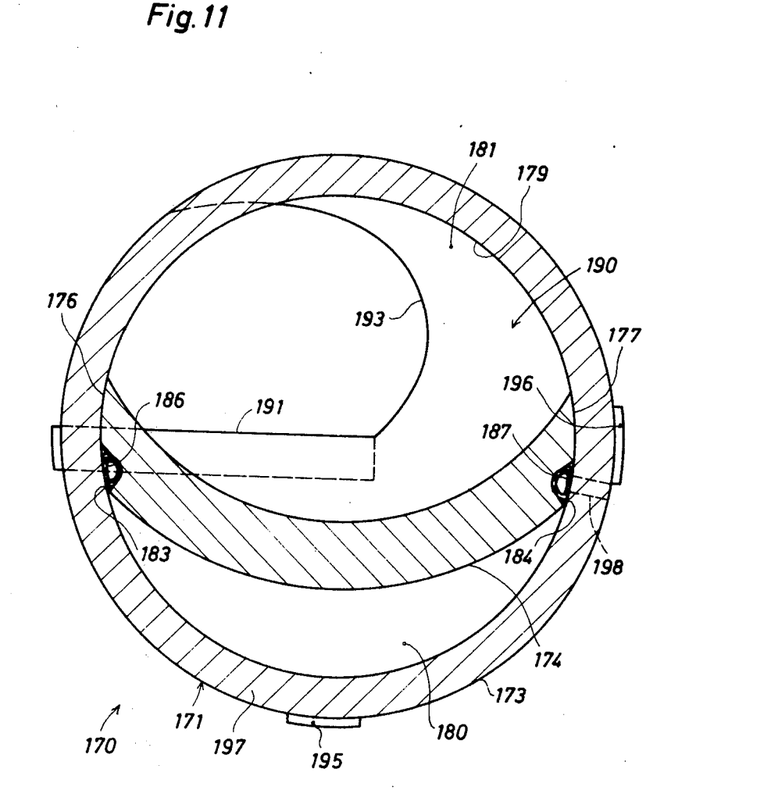
FIG. 11 shows in a sectional plan view an embodiment of the drilling stem of this invention having sealing hoses.

FIG. 11 shows a section through a stem 171 of a deep drilling tool 170. Similarly as in the preceding examples, the stem 171 has a pipe 173 and an arched dividing element 174 the lateral surfaces or edges 176 and 177 of which are in contact with diametrically juxtaposed portions of the inner wall 179 of the stem pipe 173. The dividing element or partition 174 divides the inner space of the pipe 173 in a passage 180 for feeding a pressure fluid into the bore hole and a passage 181 for the discharge of the mixture of the pressure fluid with the chips. The partition 174 is shown in a condition without torsional prestress, but could also be formed as a twisting element.

In each lateral surface 176 and 177 of the partition, a longitudinal groove 183 and 184 is provided for accommodating a hose 186 and 187, made preferably of an oil-resistant rubber. The hoses can be inflated by incoming pressure fluid and in this way control of the sealing effect of the partition by increasing pressure against the lateral surfaces and the inner wall of the tube can be obtained.

The stem 171 is connected to a drill bit 190 that includes a cutting edge 191, a chip mouth 193 and guiding pads 195 and 196. The guiding pads space the drill bit from the wall of the bore hole. It is advantageous when during the drilling process the guiding pads are lubricated. For this purpose, hose 187 opens into a lubrication channel 198 leading to a calibrated nozzle (not shown) at the outer surface of the drill bit in the range of the guiding pads 195 and 196, where the lubricating fluid is automatically distributed. The pressure of the lubrication fluid in the interior of the hose 187 and thereby the degree of sealing pressure of the hose 187 against the inner wall 179 of the pipe 173 and the longitudinal groove 184, may be controlled.

Figure 12:
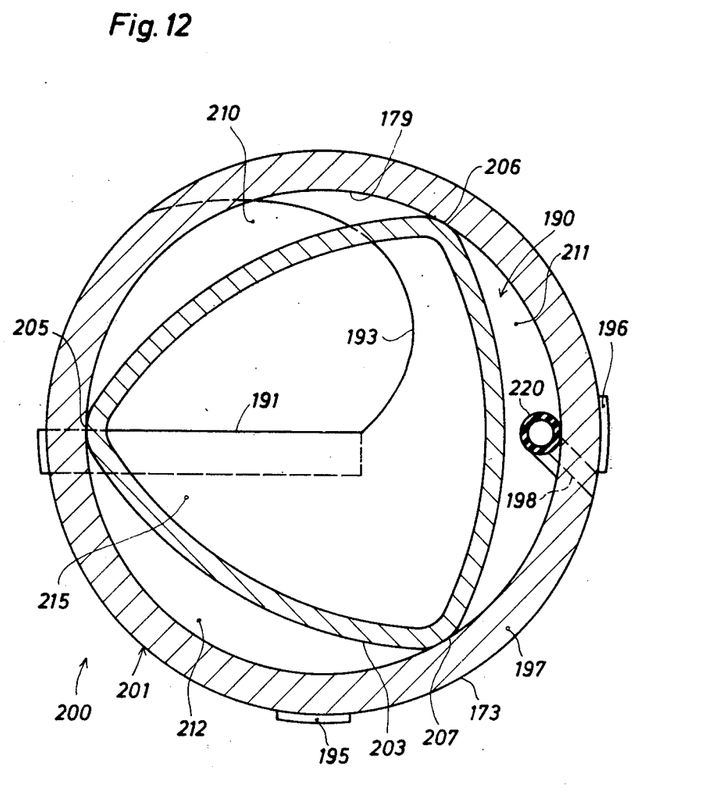
FIG. 12 is a sectional plan view of an embodiment of the drilling stem having a single lubricating hose.

FIG. 12 shows another modification of the deep-drilling tool 200 having a drill stem 201 provided in its stem pipe 173 with a dividing member 203 in the form of a K-profile tube having the cross-section of a spherical triangle. The apex edges 205, 206 and 207 of the dividing member 203 contact the inner wall 179 of the stem pipe 173 and subdivide the interior space of the pipe 173 into passages 210, 211 and 212 for feeding the pressure fluid and into a central passage 215 for discharging the mixture of the pressure fluid and chips.

Also in this illustration the dividing member 203 is not twisted. Consequently there is no torsional prestress between the dividing element 203 and the pipe 173 of the stem 201. Alternatively, stem 201 could also be torsionally prestressed in accordance with the embodiment shown in FIG. 10.

A hose 220 of a oil-resistant material is disposed in the passage 211 and is connected to the lubrication channel 198 in the proximity of the drill bit. The hose 220 extends to the rear end of the stem 201 where it is connected to a lubricating device not shown in the drawing. The lubricating agent is discharged through the lubrication channel 198 to the drill bit and the guiding pads as described before.

It will be understood that each of the elements described above, or two or more together, may also find a useful application in other types of constructions of the drilling tool differing from the type described above.

While the invention has been illustrated and described as embodied in various deep drilling tools, it is not intended to be limited to the details shown, since various modifications and structural changes may be made without departing in any way from the spirit of this invention.

What is claimed as new and desired to be protected by Letters Patent is set forth in the appended claims:

1. In a deep drilling tool for workpieces including a tubular drill bit and a tubular drill stem connectable to the drill bit and having an inner wall, a combination comprising a longitudinal partition having lateral surfaces and dividing the interior of said stem in at least two separate passages, at least one of said passages forming a pressure fluid feeding passage communicating with an exterior surface of said tool, and another of said passages forming a discharge passage for a mixture of said pressure fluid and the drilling chips and communicating with the interior of said drill bit; and an elastic sealing member at each of said lateral surfaces of said partition and in slidable contact with the inner wall of said drill stem.

2. A combination as defined in claim 1, wherein said elastic sealing member is a sealing hose inflatable by pressure fluid.

3. A combination as defined in claim 2, wherein a lubrication passage is provided between said sealing hose and the exterior surface of the tool at said drill bit, and wherein said pressure fluid in said sealing hose is a lubricant.

4. A combination as defined in claim 1, wherein said partition is in the form of a single dividing wall.

5. A combination as defined in claim 4, wherein said partition is arched transversely to the longitudinal axis of the tool.

6. A combination as defined in claim 5, wherein a convex surface of the partition projects into the pressure fluid feeding passage.

7. A combination as defined in claim 1, wherein the cross-sectional area of the discharge passage at least equals the maximum cross-sectional area of the interior of the drill bit.

8. A combination as defined in claim 1, wherein said partition is twisted and connected to the drill stem under torsional strain.

9. A combination as defined in claim 1, wherein said lateral surfaces of the partition bear upon the inner wall of the drill stem along two diametrically opposed contact lines.

10. A combination as defined in claim 1, wherein said elastic sealing members contact the inner wall of the drill stem along two diametrically opposed contact lines.

11. A combination as defined in claim 1, wherein said lateral surfaces of the partition contact the inner wall of said drill stem along two contact lines that are spaced apart at a smaller distance than a maximum clearance of said drill stem and, viewed from the pressure fluid feeding passage, are located beyond said maximum clearance.

12. A combination as defined in claim 1, wherein said elastic sealing members contact the inner wall of said drill stem along two contact lines that are spaced apart at a smaller distance than a maximum clearance of said drill stem and, viewed from the pressure fluid feeding passage, are located beyond said maximum clearance.

13. A combination as defined in claim 1, wherein said partition at least partly surrounds said discharge passage.

14. A combination as defined in claim 1, wherein the interior of said drill bit fully registers with said discharge passage in said stem.

* * * * *